United States Patent
Mohan et al.

(10) Patent No.: US 8,818,387 B1
(45) Date of Patent: Aug. 26, 2014

(54) METHOD AND SYSTEM FOR REDUCING FREQUENT CONNECTION ESTABLISHMENT REQUIREMENTS BETWEEN NETWORK ELEMENTS

(71) Applicant: Sprint Spectrum L.P., Overland Park, KS (US)

(72) Inventors: David Mohan, Overland Park, KS (US); Munawar Uddin, Naperville, IL (US); Saravana Velusamy, Olathe, KS (US); Young Zhao, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 10 days.

(21) Appl. No.: 13/669,004

(22) Filed: Nov. 5, 2012

(51) Int. Cl.
*G06F 15/16* (2006.01)
(52) U.S. Cl.
USPC ........................................ 455/450; 455/422.1
(58) Field of Classification Search
USPC ............... 455/422.1, 450, 528, 574
See application file for complete search history.

(56) References Cited

U.S. PATENT DOCUMENTS

| 6,748,247 B1 | 6/2004 | Ramakrishnan et al. |
| 7,289,480 B2 | 10/2007 | Lundstrom et al. |
| 2009/0257378 A1 * | 10/2009 | Cuny et al. .................... 370/328 |

* cited by examiner

*Primary Examiner* — Sam Bhattacharya

(57) ABSTRACT

Disclosed are a method, apparatus, and system for managing connections in a wireless communication network. When a user equipment device (UE) transitions between an idle state and an active state, a radio link is established between a base station and the UE and a core network link is established between the base station and a core network entity. In response to detecting that no data packets are exchanged between the UE and the base station, a timer is initiated. Further, in response to detecting that data packets are being exchanged between the UE and the base station, the timer is reset. The radio link is released in response to the timer reaching a first predetermined value associated with a first inactivity period and the core network link is released in response to the timer reaching a second predetermined value associated with a second inactivity period.

20 Claims, 4 Drawing Sheets

METHOD AND SYSTEM FOR REDUCING FREQUENT CONNECTION ESTABLISHMENT REQUIREMENTS BETWEEN NETWORK ELEMENTS

BACKGROUND

A typical cellular wireless communication system or network includes a number of antenna systems that radiate radio frequency (RF) radiation patterns to define wireless coverage areas, such as cells and cell sectors. The antenna systems or base stations are in turn coupled to one or another form of controller, which can be coupled to a telecommunications switch or gateway. The switch or gateway may then be coupled with a transport network, such as the public switched telephone network (PSTN) or a packet-switched network (e.g., the Internet).

A user equipment device (UE), such as a cell phone, tablet computer, tracking device, embedded wireless module, and other wirelessly equipped communication devices, can operate in the cells defined by the radiation patterns from the base stations. With the typical wireless communication system described above, a communication channel or link can be established between the UE and the transport network, via the base station, controller, switch or gateway, and possibly other elements. Thus, a UE operating within a coverage area of a base station can engage in air interface communication with the base station and can thereby communicate via the base station with various remote network entities or with other UEs.

In general, the wireless communication system may operate in accordance with a particular air interface protocol or radio access technology. Examples of existing air interface protocols include CDMA (e.g., 1xRTT and 1xEV-DO), LTE (e.g., FDD LTE and TDD LTE), WiMAX, iDEN, TDMA, AMPS, GSM, GPRS, UMTS, EDGE, MMDS, WI-FI, and BLUETOOTH. Each protocol may define its own procedures for initiation of communications, establishment of communication links, release of communication links, handoff between coverage areas, and other functions related to air interface communication.

Further, depending on the specific underlying technologies, protocols, and architecture of a given wireless communication system, the various elements of the system may take different forms and may make up different portions of the wireless communication system. In one example, the base stations, the communication devices, and possibly other elements generally make up a radio access network (RAN) portion of the system. Further, in the present example, the controllers, switches, gateways, and perhaps other elements generally make up a core network portion of the system. Although, in practice, different elements may overlap in one or more portions of the wireless communication system.

Illustratively, in an LTE system, the base station is usually referred to as an eNodeB and a mobility management entity (MME) can be coupled to the eNodeB to coordinate functionality between multiple eNodeBs. Each MME and eNodeB can also be coupled to a serving gateway (SGW) and/or a packet gateway (PGW). In a CDMA system, the base station is referred to as a base transceiver system (BTS) and the BTS is usually under the control of a base station controller (BSC). Further, each BSC can be coupled to a mobile switching center (MSC) and/or a packet data serving node (PDSN) for instance. Other architectures and operational configurations of the wireless communication system are possible as well.

OVERVIEW

Generally, a UE can transition between an idle state and an active communication state. When in the idle state, such as when the UE is first turned on, no active data transfer or communication is being performed between the UE and the wireless communication system. However, in the idle state, the UE can communicate with the wireless communication system, such as with one or more of the base stations, to select a suitable cell with good signal quality or to request transition to the active state, for instance.

When the UE transitions from the idle state to the active state, such as when a request is made through the UE to access a webpage, the UE communicates with the wireless communication system to establish an active communication link or connection over which data can be transferred. This active communication link may actually include one or more communication links between the UE and elements of the wireless communication system. Illustratively, the active communication link may include a link between the UE and a base station (e.g., a radio link) and a link between the base station and a core network element or entity (e.g., a core network link). In general, the establishment of these links includes messaging and processing between the UE, the base station, and the core network entity to identify and assign necessary network resources for the links. Once the network resources are identified and assigned, the links can be established and data can be transferred between the UE and the wireless communication system.

In order to make efficient use of network resources, the established communication links and assigned network resources can be released after a period of inactivity, which can be characterized by a period of no active data transfer (or no requests to restart active data transfer) between the UE and the other network elements. Typically, the duration of the inactivity period is set fairly low to preserve battery life of the UEs. In one non-limiting example, the duration of the period of inactivity before the communication links and networks resources are released is between about 5-10 seconds. However, since this inactivity period is short, the communication links and assigned network resources may be released and then need to be reestablished repeatedly during a short period of time.

For example, a user may access a webpage through the UE and begin reviewing the contents of the webpage, during which review the inactivity period may lapse and the communication links and network resources released along with the UE transitioning to the idle state. Shortly thereafter, the user may finish reviewing the webpage and click on a link in the webpage, which will trigger a transition back to the active communication state and the reestablishment of the communication links and reassignment of the network resources. This release and reestablishment of communication links can occur repeatedly over a relatively short period and increases processing requirements on the wireless communication system. Further, the release and reestablishment of communication links reduces efficiency of UE applications due to increased connection setup time.

The present disclosure addresses these issues by introducing a second inactivity period for certain communication links, in particular, the core network link between the base station and the core network entity. The core network link and the associated network elements are not affected by the same battery life preservation concerns that affect the UE. Consequently, the duration of the second inactivity period can be longer than the first inactivity period so that the core network link will remain established for a longer period. Thus, each time the UE transitions back to the active state, the core network link will already be established to facilitate immediate flow of data (after the radio link between the UE and the base station is re-established).

In another example, the duration of the second inactivity period can be adjusted, for example, in response to a frequency of release and reestablishment of the communication link, although, in general, the second inactivity period may still be longer than the first inactivity period. Thus, for example, the second inactivity period can be introduced and/or extended in duration based on a determination that a communication link between the UE and the wireless communication system has been released and re-established with a frequency greater than a given threshold, such as greater than three times within twenty seconds.

These as well as other aspects, advantages, and alternatives will become apparent to those of ordinary skill in the art by reading the following detailed description, with reference where appropriate to the accompanying drawings. Further, it should be understood that the disclosure provided by this overview and the other description throughout this document is intended to illustrate the invention by way of example only and that numerous variations may be possible.

DETAILED DESCRIPTION

Figure 1:
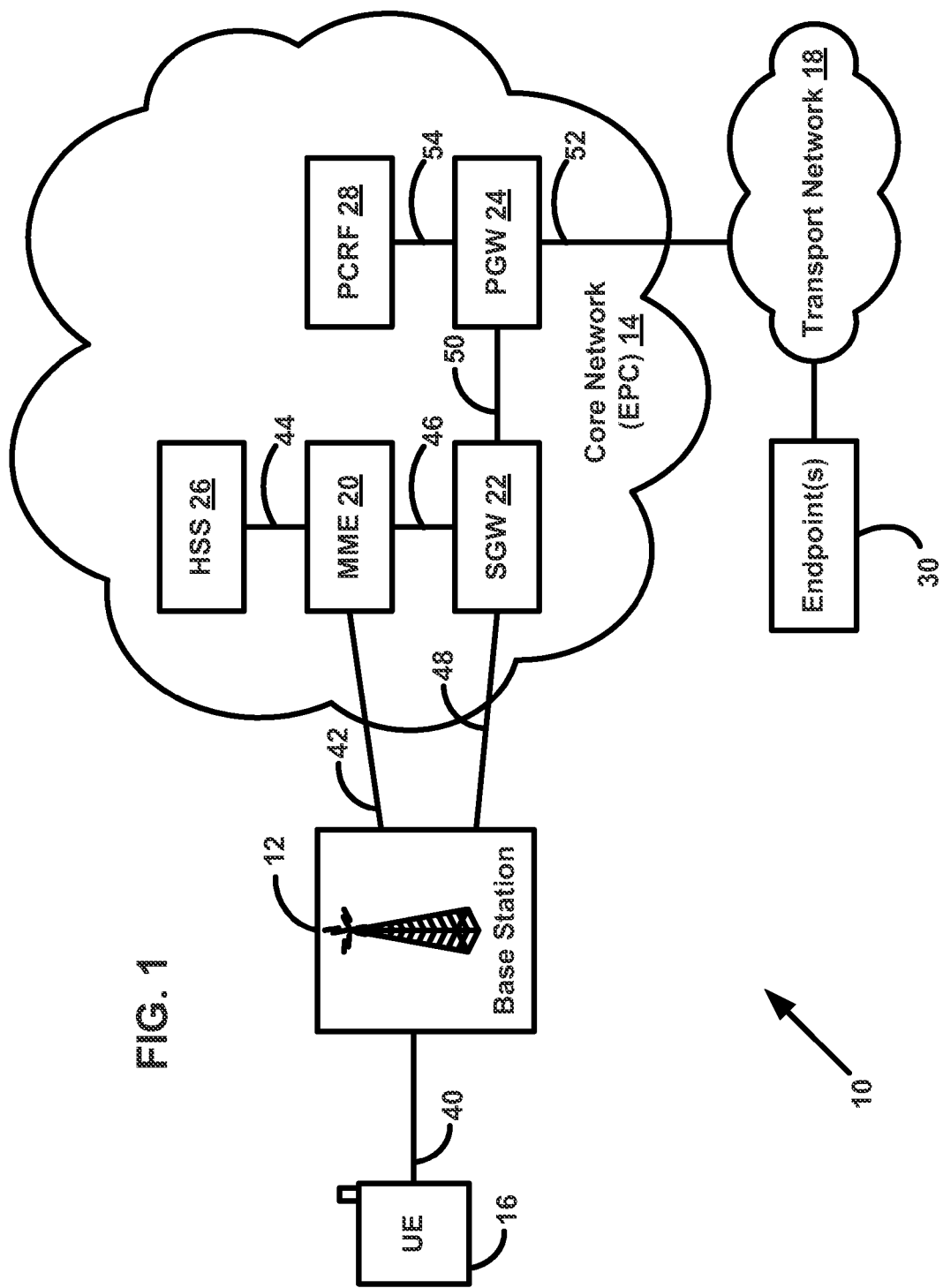
FIG. 1 is a block diagram of a wireless communication network according to one embodiment of the present disclosure.

The present disclosure will be described by way of example in a scenario where a UE transitions between idle and active states. Referring to the drawings, FIG. 1 is an example block diagram of a wireless communication network 10 that may be used in an LTE system. It is to be understood, however, that other network architectures could be used in other examples.

In FIG. 1, the wireless communication network 10 is illustrated with a base station 12 and a core network 14. The base station 12 and the core network 14 function to provide a UE 16 with cellular wireless communication service, such as connectivity with a transport network 18. The transport network 18 can be the PSTN or a packet-switched network, for instance. In LTE terminology, the base station 16 corresponds to an eNodeB and generally includes transceiver equipment and antennas (e.g., on an antenna tower) arranged to define one or more cellular wireless coverage areas such as a cell and cell sectors. Further, in the context of LTE, the core network 14 includes an evolved packet core (EPC) network, which, in turn, includes various core network or EPC nodes or entities. In the present example, the core network entities include an MME 20, an SGW 22, a PGW 24, a home subscriber server (HSS) 26, and a policy and charging rules function (PCRF) 28.

The UE 16, which can be a wireless telephone, wireless e-mail device, wirelessly-equipped computer (such as handheld, tablet, or laptop computers), or other type of wireless communication device, can be engaged in communication sessions with one or more endpoints 30 via the base station 12. The endpoint(s) 30 may include, for example, one or more voice-over-packet (VoP) communication devices, e-mail servers, messaging servers, streaming media servers, gaming servers, and/or Web servers. In one example, the endpoint(s) 30 are communicatively coupled to the transport network 18, which can be a packet-switched network. Thus, generally a communication session between the UE 16 and the endpoint(s) 30 may involve the exchange of packets containing voice, video, text, or other data.

Further, although FIG. 1 shows the base station 12 serving one UE 16, it is to be understood, that a base station may serve a greater or fewer number of user devices at a particular point in time. Generally, in practice, the wireless communication network 10 may include a plurality of UEs 16, base stations 12, core networks 14 (and core network entities), and/or transport networks 18, it being understood that FIG. 1 only represents one non-limiting arrangement of the network.

To support communications between the UE 16 and the transport network 18, the wireless communication network 10 may include the PGW 24, which can allocate Internet Protocol (IP) addresses for the UE. Further, the PGW 24 may exchange packets with the base station 12 via the SGW 22. The SGW 22 may also serve as an anchor point for communication sessions when UEs move between base stations.

The wireless communication network 10 may also include one or more control nodes that control communications involving UEs. For example, the network 10 includes the MME 20, which controls communications between the UE 16 and SGW 22. The MME 20 may, in turn, be communicatively coupled to the HSS 26, which stores subscriber information.

The UE 16 may operate in one of three possible states: detached, idle, and active. The UE 16 typically operates in the detached state while it is searching for and registering with the network 10. The UE 16 typically operates in the active state once it has registered with the network 10 and has a radio resource control (RRC) connection or radio link 40 with an eNodeB (e.g., while actively engaged in a communication). Further, the UE 16 typically operates in the idle state when it is registered but is not actively engaged in a communication, and thus does not have an RRC connection 40.

Referring more particularly to the transition of the UE 16 between the idle and active states, during this transition, a network attachment process is performed to register the UE, identify and assign network resources, and establish a dedicated communication connection or link between the UE and the network 10. This network attachment process can be performed when the UE 16 is requesting IP-based internet services, for instance. Generally, the network attachment process and other processes for registering a UE and establishing dedicated communication links are known. An illustrative example of a network attachment process will now be discussed in the context of LTE and with further reference to FIG. 1.

In the present example, the network attachment process begins with the UE 16 sending an RRC connection request to the eNodeB 12. The RRC connection request generally includes identification information for the UE and RRC connection parameters. Responsive to the RRC connection request, the eNodeB 12 configures and establishes the RRC connection 40 with the UE 16.

The UE 16 can then send an attach request message to the MME 20 via the eNodeB 12 to request establishment of one or more core network connections or links between the base station 12 and the core network 14. The attach request message can be sent through the RRC connection 40 between the UE 16 and the eNodeB 12 and an S1-MME connection 42 between the eNodeB and the MME 20. Further, the attach request message (and other messages discussed in this example) can be sent over a non-access stratum (NAS) layer of the network 10.

In response to the attach request message, the MME 20 identifies and authenticates the UE 12 based on authentication information in the attach request message or received from the HSS 26. During this identification/authentication process, the MME 20 can also update the HSS 26 with a location of the UE 16. In the present example, the MME 20 and the HSS 26 can communicate over an S6a connection 44.

The MME 20 then selects an SGW 22 and a PGW 24 to be used to establish the communication link with the UE 16. The MME 20 can select the SGW 22 and the PGW 24 based on information in the attach request message and location information in the HSS 26 related to the UE 16, for example. The MME 20 then sends a create session request to the selected SGW 22, such as over an S11 connection 46 between the MME and the SGW.

The create session request is received by the SGW 22, which creates an access bearer for the UE 16. More particularly, the SGW 22 creates an access bearer for a S1-U connection 48 between the SGW and the eNodeB 12. The SGW 22 also communicates with the selected PGW 24, such as over an S5 or S8 connection 50 between the SGW and the PGW, to create access bearers for the connection 50 and for an SGi connection 52 between the PGW and the transport network 18. These access bearers and connections are later used to serve the UE 16 in the active state. The PGW 24 creates these access bearers and allocates an IP address for the UE 16. The PGW 24 can also communicate with the PCRF 28, such as over a Gx interface 54, to identify billing, rating, or charging information for the UE 16. Generally, these access bearers are sets of network parameters that define how data over a connection (e.g., data to and from the UE 16) is treated, such as with a guaranteed bit rate or not. The creation of these access bearers also involves identifying and assigning necessary network resources for the active communication links between the UE 16 and the network 10. After the access bearers are created, the SGW 22 sends a create message response back to the MME 20.

The MME 20 now sends a context setup request to the eNodeB 12, which includes an attach accept message for the UE 16. After receiving the context setup request, the eNodeB 12 establishes security parameters with the UE 16 and reconfigures resources to the UE by sending an RRC connection reconfiguration request to the UE. The UE 16 updates its RRC connection configuration in response to the request and responds to the eNodeB 12 with a reconfiguration complete message and with other parameters that are later used by the SGW 22 to establish the various access bearers.

The eNodeB 12 passes the reconfiguration complete message and the other parameters to the MME 20, which, in turn, passes the other parameters to the SGW 22. Responsively, the SGW 22 completes the allocation and establishment of the access bearers for the connection 48 with the eNodeB 12. The SGW 22 also communicates with the PGW to complete the allocation and establishment of the access bearers for the connections 50, 52. Thereafter, the SGW 22 responds to the MME 20 with a modify bearer response and the MME responds to the UE 16 with an activation message. The MME 20 also creates and stores a context for the UE, which includes user subscription information downloaded from the HSS 44 and also holds dynamic information, such as a list of bearers that were created and capabilities of assigned network resources.

Now, the UE 16 is transitioned to the active communication state and is connected to the network 10 through the reconfigured RRC connection (radio link) 40 and a core network link, which in the present example includes one or more connections or links to the core network, such as one or more of the connections 42-54.

As discussed above, the radio link, the core network link, and associated network resources that are established or assigned when the UE 16 is transitioned to the active state can be released after a period of inactivity. Typically, the release of the links and resources involves the eNodeB 12 sending a detach request to the MME 20. In response to the detach request, the MME 20 sends a delete session request to the SGW 22, which in turn sends the delete session request to the PGW 24. The PGW 24 can communicate with the PCRF 28 to terminate the session by deleting the access bearer for the connection 50 and releasing associated network resources. The PGW 24 sends a delete session response or confirmation to the SGW 22. Subsequently or concurrently, the SGW 22 deletes the access bearer(s) for the connections 48 and/or 46 and sends a delete session response or confirmation to the MME 20. The MME 20 communicates with the UE and the eNodeB to release the links 40, 42 and any associated resources. The UE 16 is then transitioned to the idle state.

Thereafter, to transition the UE 16 back to the active state, the various communication links need to be re-established, as discussed above. This release and re-establishment of the communication links and assignment of necessary resources creates a processing burden on the wireless communication system, especially when performed repeatedly over a short period of time. The present disclosure addresses this processing burden by separately controlling the release of different links and network resources. More particularly, the flowcharts of FIGS. 2A and 2B depict functions that can be carried out in accordance with the present disclosure to control the release of these links and network resources.

Figure 2A:
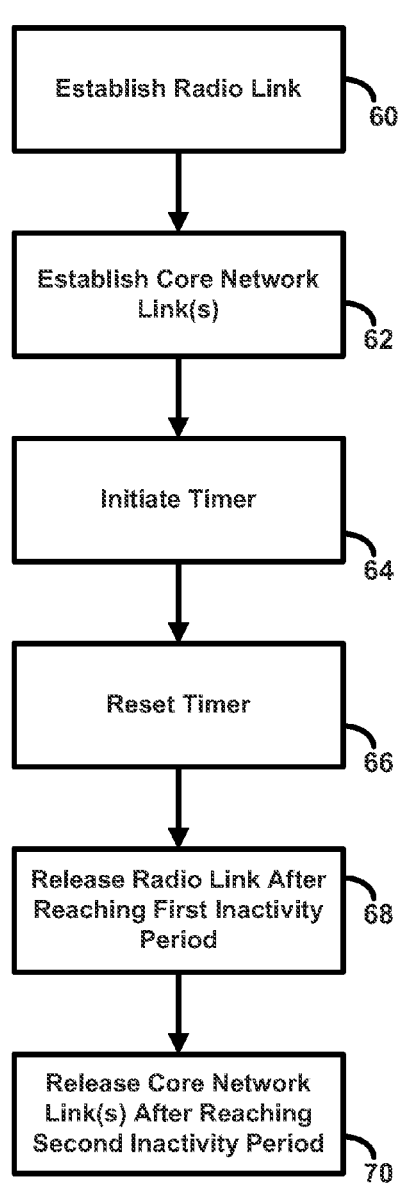
FIG. 2A is a flow chart depicting functions that can be carried out in accordance with an embodiment of the present disclosure.
Figure 2B:
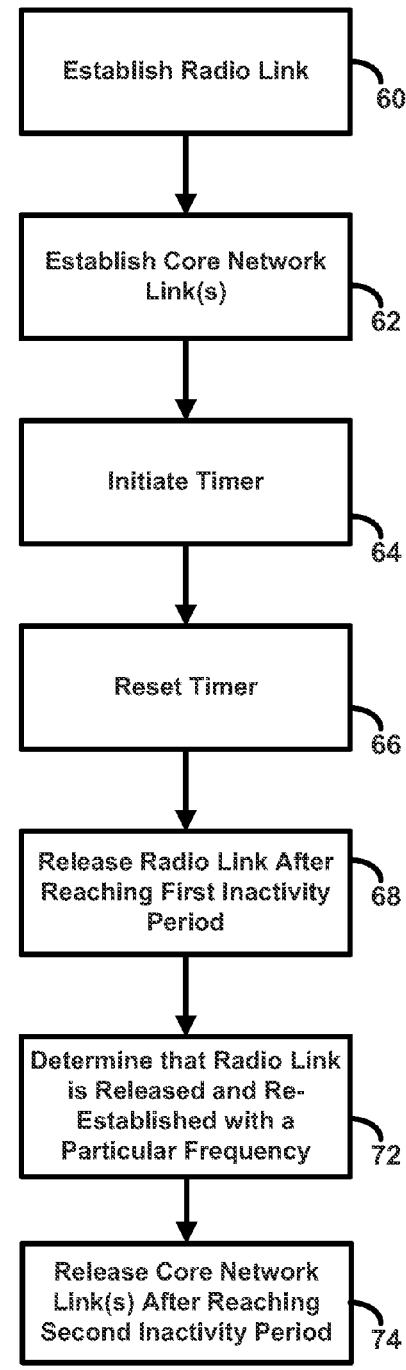
FIG. 2B is a flow chart depicting functions that can be carried out in accordance with another embodiment of the present disclosure.

Referring first to FIG. 2A and with further reference to FIG. 1, a UE is transitioned between the idle state and the active state by establishing a radio link, at block 60, and establishing a core network link, at block 62. An example of these functions is described above, although other examples are also possible.

After the links are established at blocks 60, 62, a timer can be initiated at block 64. In one example, the eNodeB initiates the timer. Although, in other examples, the timer can be associated with and/or initiated by the UE, the MME, or some other component of the network. In the present example, the eNodeB initiates the timer in response to detecting that no data packets are exchanged between the UE and the base station. The timer is reset at block 66 if the eNodeB detects that data packets are being exchanged between the UE and the base station.

At block 68, the eNodeB releases the radio link with the UE (and associated network resources) when the timer reaches a first predetermined (radio link) value that corresponds to a radio link inactivity period. This radio link inactivity period is set fairly low so that the radio link with the UE can be released after a relatively short period of inactivity to help preserve battery life of the UE. For example, this radio link inactivity period can be between 5-10 seconds.

At block 70, the eNodeB releases the core network link between the eNodeB and the core network (and associated network resources) when the timer reaches a second predetermined (core network) value that corresponds to a core network link inactivity period. As described above, the core network link can include one or more of the links 42-52 described above in relation to FIG. 1. The core network link inactivity period can be longer than the radio link inactivity period, such that the core network link will be maintained longer than the radio link. Consequently, if the UE transitions back to the active state before the timer reaches the core network value, the core network link will still be available to facilitate immediate flow of data (after the radio link is re-established).

FIG. 2B is similar to FIG. 2A and includes identical blocks 60-68 but also introduces a block 72, at which the eNodeB determines that the radio link is released and re-established with a particular frequency above a given threshold. More particularly, after the radio link is released at block 68, the UE can again transition back to the active state by re-establishing the radio link in response to a request from the UE, for example. Thereafter, as described above, the eNodeB can release the re-established radio link again if the timer reaches the first predetermined value. At block 72, the eNodeB determines whether this release and re-establishment of the radio link has occurred a given number of times within a set period of time, which corresponds to the frequency of release and re-establishment of the radio link. If the eNodeB determines that this frequency is greater than a given threshold, such as releasing and re-establishing the radio link three times within twenty seconds, then the eNodeB can modify the second predetermined (core network) value.

At block 74 of FIG. 2B, which is similar to block 70 of FIG. 2A, if the eNodeB determines that the frequency is greater than the given threshold, the eNodeB can dynamically adjust the core network inactivity period, such as by setting the core network inactivity period to be greater than the first inactivity period. In one example, the eNodeB can set the length of the core network inactivity period to be generally proportional to the frequency of release and re-establishment of the radio link. In this example, generally, the eNodeB can set the length of the core network inactivity period higher for higher frequencies of release and re-establishment of the radio link and lower for lower frequencies of release and re-establishment.

In another example, the core network inactivity period may not be triggered until the frequency of release and re-establishment of the radio link is above the given threshold. In this example, the core network link can be released along with the radio link unless the eNodeB determines that the radio link and the core network link are being released and re-established with a particular frequency above the given threshold.

As discussed above, the core network inactivity period can be used to maintain the core network link for a longer period than the radio link. Thus, if the UE transitions back to the active state before the timer reaches the core network value, the core network link will still be available to facilitate immediate flow of data (after the radio link is re-established).

Figure 3:
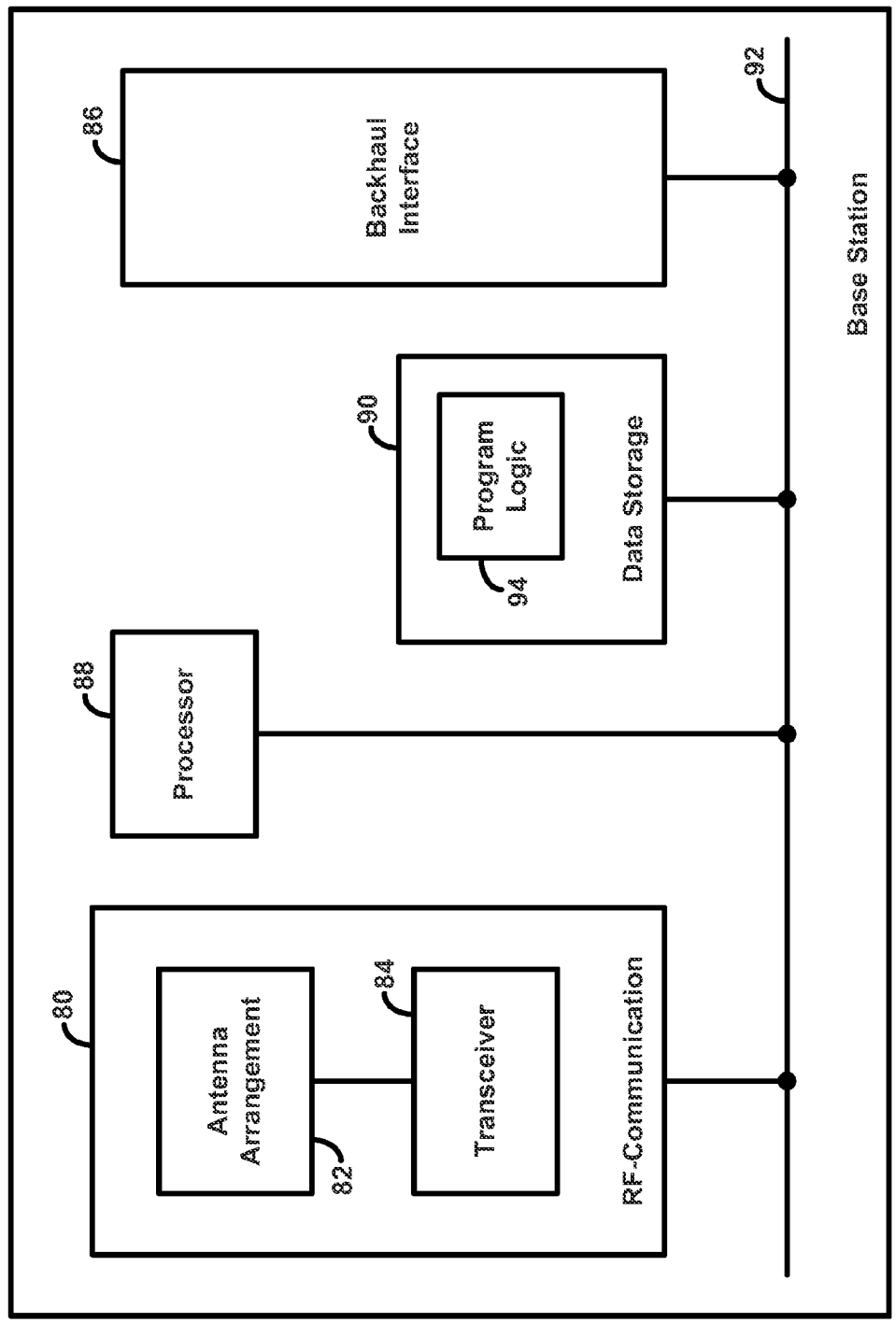
FIG. 3 is a block diagram of an example base station operable within the network of FIG. 1.

Referring now to FIG. 3, a block diagram of a base station is illustrated showing some of the functional components that each base station may include in the arrangement of FIG. 1. As shown, the base station includes for each of its one or more coverage areas an RF communication block 80 that includes a respective antenna arrangement 82 and transceiver 84, a backhaul interface 86, a processor 88, and non-transitory data storage 90, all of which may be communicatively linked together by a system bus, network, or other connection mechanism 92.

The antenna arrangement 82 may include one or more antennas arranged in a manner now known or later developed for radiating to define a wireless coverage area. Typically, the antenna arrangement would be mounted at the top of an antenna tower. But the antenna arrangement can be provided in some other manner or location (such as in a small scale femtocell, for instance. Transceiver 84, in turn, preferably comprises a power amplifier, modem chipset, channel cards, and other circuitry for sending and receiving communications via the antenna arrangement 82 in accordance with the agreed air interface protocol.

The backhaul interface 86 comprises a mechanism for communicatively linking the base station with core network entities (e.g., the MME and SGW described above). Thus, the backhaul interface 86 may provide a communication link interface between the base station and the core network entity. These communication links can be direct links or may include one or more intermediate nodes. For instances, under the LTE protocol, the core network entity can be an MME and the base stations can be eNodeBs, such that the backhaul interface 86 can be an S1-MME link interface. In any event, the backhaul interface 86 may take whatever form is necessary to couple with the communication links to the core network.

The processor 88 may include one or more general purposes processors (e.g., INTEL microprocessors) and/or one or more special purpose processors (e.g., dedicated digital signal processors or application specific integrated circuits). If the processor comprises multiple processors, the processors may work separately or in combination (e.g. in parallel). Further, the functions of the processor 88 can be integrated in whole or in part with the transceiver 84 or with one or more other aspects of the base stations.

The data storage 90, in turn, may include one or more volatile and/or non-volatile storage components, such as magnetic, optical, or organic storage components, which can be integrated in whole or in part with the processor 88. As shown, the data storage 90 may contain program logic 94, which can be executed by the processor 88 to carry out certain base station functions described herein, for example, the functions described with reference to FIGS. 1, 2A, and 2B.

Figure 4:
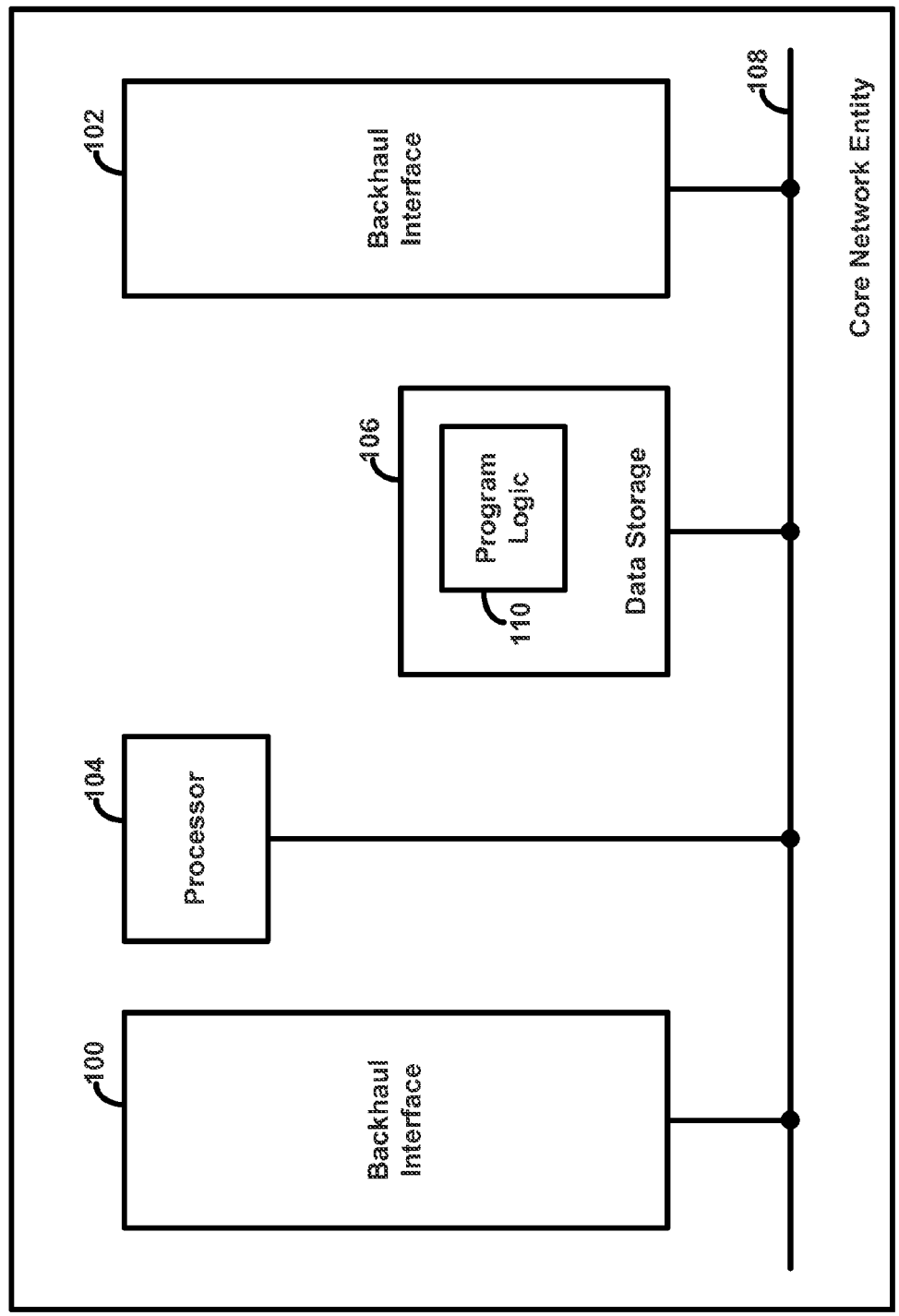
FIG. 4 is a block diagram of an example core network entity operable within the network of FIG. 1.

FIG. 4 is a block diagram of the core network entity, for instance an MME, SGW, or PGW, showing some of the functional components that the core network entity may include in the arrangement of FIG. 1. As shown, the core network entity may include a first backhaul interface 100, a second backhaul interface 102, a processor 104, and non-transitory data storage 106, all of which may be communicatively linked together by a system bus, network, or other connection mechanism 108.

The first backhaul interface 100 functions to provide direct or indirect connectivity with base stations and particularly with the backhaul interface 86 of each base station, so as to facilitate communication of control signaling between the core network entity and each base station. As with the base station backhaul interface 86, the first backhaul interface 100 of the core network entity may be arranged for wired and/or wireless backhaul communication and may take various forms depending on the links that connect the core network entity with each base station. For example, the first backhaul interface 100 may connect an MME with one or more S1-MME links to a plurality of eNodeBs. The first backhaul interface 100 may alternatively connect an SGW with one or more S1-links to a plurality of eNodeBs.

The second backhaul interface 102 functions to provide connectivity with other core network entities and/or with a transport network. For instance, if the core network entity is an MME, the second backhaul interface 102 may connect with a S11 link to an SGW. In another example, if the control node is a SGW, the second backhaul interface 102 may connect with a S5 or S8 link to a PGW, which in turn can provide connectivity with the transport network. Other examples are possible as well.

As with the base station processor 90, the control node processor 104 may include one or more general purposes processors and/or one or more special purpose processors.

The data storage 106, in turn, may include one or more volatile and/or non-volatile storage components, such as magnetic, optical, or organic storage components, which can be integrated in whole or in part with the processor 104. As shown, the data storage 106 may contain program logic 110, which can be executed by the processor 106 to carry out various core network entity functions described herein.

An illustrative embodiment has been described above. It should be understood, however, that variations from the embodiment discussed are possible, while remaining within the true spirit and scope of the invention as claimed.

For example, the present disclosure has been discussed primarily in relation to an LTE network. However, other network architectures may also be used to implement the concepts disclosed herein. Illustratively, a CDMA network can also use different inactivity timers to separately manage radio links and core network links when a UE transitions between an idle state and an active state.

We claim:

1. A method for managing connections in a wireless communication network, the method comprising:
    establishing a radio link between a base station and a user equipment device (UE);
    establishing a core network link between the base station and a core network entity, wherein the radio link and the core network link are configured to connect the UE to a core network;
    initiating a timer, responsive to detecting that no data packets are exchanged between the UE and the base station;
    resetting the timer in response to detecting that data packets are being exchanged between the UE and the base station;
    releasing the radio link, responsive to the timer reaching a first predetermined value associated with a first inactivity period; and
    releasing the core network link, responsive to the timer reaching a second predetermined value associated with a second inactivity period.

2. The method of claim 1, wherein the second inactivity period is longer than the first inactivity period.

3. The method of claim 1, wherein the base station is an eNodeB and the core network entity is selected from the group consisting of a mobility management entity and a serving gateway.

4. The method of claim 1, further comprising determining that the radio link has been released and re-established with a frequency greater than a given threshold; and, responsive to the determination, releasing the core network link after the timer reaches the second predetermined value.

5. The method of claim 4, wherein determining that the radio link has been released and re-established with a frequency greater than a given threshold includes determining that the radio link has been released and re-established three times within twenty seconds.

6. The method of claim 1, further comprising determining that the radio link has been released and re-established with a frequency greater than a given threshold; and, responsive to the determination, adjusting the second predetermined value associated with the second inactivity period.

7. The method of claim 6, wherein adjusting the second predetermined value includes adjusting the second predetermined value to be greater than the first predetermined value.

8. A base station comprising:
    a communication interface through which the base station communicates with a user equipment device (UE) and a core network entity, wherein the base station is configured to radiate to define a wireless coverage area for serving the UE;
    a processor;
    data storage;
    first logic stored in the data storage and executable by the processor to establish a radio link between the UE and the base station;
    second logic stored in the data storage and executable by the processor to establish a core network link between the base station and the core network entity;
    third logic stored in the data storage and executable by the processor to initiate a timer in response to detecting that no data packets are exchanged between the UE and the base station;
    fourth logic stored in the data storage and executable by the processor to reset the timer in response to detecting that data packets are being exchanged between the UE and the base station;
    fifth logic stored in the data storage and executable by the processor to release the radio link, responsive to the timer reaching a first predetermined value associated with a first inactivity period; and
    sixth logic stored in the data storage and executable by the processor to release the core network link, responsive to the timer reaching a second predetermined value associated with a second inactivity period.

9. The base station of claim 8, wherein the second inactivity period is longer than the first inactivity period.

10. The base station of claim 8, wherein the base station is an eNodeB configured to operate under a Long Term Evolution air interface protocol.

11. The base station of claim 8, further comprising seventh logic stored in the data storage and executable by the processor to determine that the radio link has been released and re-established with a frequency greater than a given threshold, and wherein the sixth logic is executed in response to this determination.

12. The base station of claim 11, further wherein the seventh logic is executable to determine that the radio link has been released and re-established three times within twenty seconds.

13. The base station of claim 8, further comprising seventh logic stored in the data storage and executable by the processor to determine that the radio link has been released and re-established with a frequency greater than a given threshold; and eighth logic stored in the data storage and executable by the processor to adjust the second predetermined value associated with the second inactivity period.

14. The base station of claim 13, wherein the eighth logic is executable to adjust the second predetermined value to be greater than the first predetermined value.

15. A wireless communication network comprising:
    a user equipment device (UE);
    a base station; and
    a core network entity,
    wherein the UE is configured to communicate with the base station to establish a radio link between the UE and the base station,
    wherein the base station is configured to communicate with the core network entity to establish a core network link between the base station and the core network entity,
    wherein the base station is configured to initiate a timer in response to detecting that no data packets are being exchanged between the UE and the base station, and to reset the timer in response to detecting that data packets are being exchanged between the UE and the base station, wherein the base station is configured to release the radio link in response to the timer reaching a first predetermined value associated with a first inactivity period, and wherein the base station is configured to release the core network link in response to the timer reaching a second predetermined value associated with a second inactivity period, further wherein the second inactivity period is longer than the first inactivity period.

16. The wireless communication network of claim 15, wherein the base station is an eNodeB and the core network entity is selected from the group consisting of a mobility management entity and a serving gateway.

17. The wireless communication network of claim 15, further wherein the base station is configured to determine that the radio link has been released and re-established with a frequency greater than a given threshold, and wherein, responsive to this determination, the base station is configured to release the core network link after the timer reaches the second predetermined value.

18. The wireless communication network of claim 17, wherein determining that the radio link has been released and re-established with a frequency greater than a given threshold includes determining that the radio link has been released and re-established three times within twenty seconds.

19. The wireless communication network of claim 15, further wherein the base station is configured to determine that the radio link has been released and re-established with a frequency greater than a given threshold, and wherein, responsive to this determination, the base station is configured to adjust the second predetermined value associated with the second inactivity period.

20. The wireless communication network of claim 19, wherein adjusting the second predetermined value includes adjusting the second predetermined value to be greater than the first predetermined value.

\* \* \* \* \*